(12) United States Patent
Feber

(10) Patent No.: US 9,993,011 B2
(45) Date of Patent: Jun. 12, 2018

(54) COLD BREW FILTER SYSTEM

(71) Applicant: Max Feber, West Bloomfield, MI (US)

(72) Inventor: Max Feber, West Bloomfield, MI (US)

(*) Notice: Subject to any disclaimer, the term of this patent is extended or adjusted under 35 U.S.C. 154(b) by 134 days.

(21) Appl. No.: 15/144,339

(22) Filed: May 2, 2016

(65) Prior Publication Data

US 2017/0000289 A1    Jan. 5, 2017

Related U.S. Application Data

(60) Provisional application No. 62/186,774, filed on Jun. 30, 2015.

(51) Int. Cl.
*A47J 31/06*     (2006.01)
*A23F 5/26*      (2006.01)
*A47J 31/20*     (2006.01)
*A47J 31/00*     (2006.01)

(52) U.S. Cl.
CPC ............. *A23F 5/26* (2013.01); *A47J 31/002* (2013.01); *A47J 31/20* (2013.01)

(58) Field of Classification Search
CPC ............ A47J 31/002; A47J 31/20; A23F 5/26
See application file for complete search history.

(56) References Cited

U.S. PATENT DOCUMENTS 3,077,156 A * 2/1963 Egi ..................... A47J 31/303
                                                    99/285
4,098,176 A * 7/1978 Perez .................. A47J 31/303
                                                    99/303
4,999,140 A * 3/1991 Sutherland .......... B01F 3/04801
                                                    141/18
5,531,254 A * 7/1996 Rosenbach ............... A23L 2/54
                                                    141/113
5,799,566 A * 9/1998 Breinlinger ............. A47J 31/20
                                                    99/295
2003/0000887 A1* 1/2003 Zaske ..................... A47J 31/06
                                                    210/464
2003/0205145 A1* 11/2003 Chang ................... A47J 31/303
                                                    99/303

(Continued)

FOREIGN PATENT DOCUMENTS

GB             5307    *  5/1903
GB           622584    *  5/1949

OTHER PUBLICATIONS www.kickstarter.com webpage for "Mason Jar Joe Cold Brewed Coffee Maker Steeps in Mason Jars" (exact date unknown).

*Primary Examiner* — Anthony Weier
(74) *Attorney, Agent, or Firm* — Harness, Dickey & Pierce, P.L.C.

(57) ABSTRACT

A cold brew coffee filtration assembly having a closure. The closure includes a first side and a second side. The first side has a first coupling member configured to couple the closure to a first container. The second side has a second coupling member configured to couple the closure to a second container. A filter is between the first and the second coupling members. A support member supports the filter and defines an air channel extending through the support member and across the filter. A tube is configured to be connected to the support member and extend from the first side of the closure to a bottom of the first container when the first container is coupled to the first side of the closure, the tube further defining the air channel.

10 Claims, 3 Drawing Sheets

(56) References Cited

U.S. PATENT DOCUMENTS

| | | | | |
|---|---|---|---|---|
| 2006/0185521 A1* | 8/2006 | Publicover | ............... | A47J 31/20 |
| | | | | 99/279 |
| 2012/0260806 A1* | 10/2012 | Rolfes | ..................... | A47J 31/38 |
| | | | | 99/285 |
| 2013/0312617 A1* | 11/2013 | Toporovsky | .......... | A47J 31/005 |
| | | | | 99/280 |
| 2014/0205725 A1* | 7/2014 | Albanese | ................. | A47J 31/20 |
| | | | | 426/433 |
| 2015/0223628 A1* | 8/2015 | Cheung | ................... | A47J 31/02 |
| | | | | 99/296 |
| 2015/0322389 A1* | 11/2015 | Anderson | .............. | A61B 50/10 |
| | | | | 99/276 |
| 2016/0316957 A1* | 11/2016 | Tran | ...................... | A47J 31/005 |

* cited by examiner

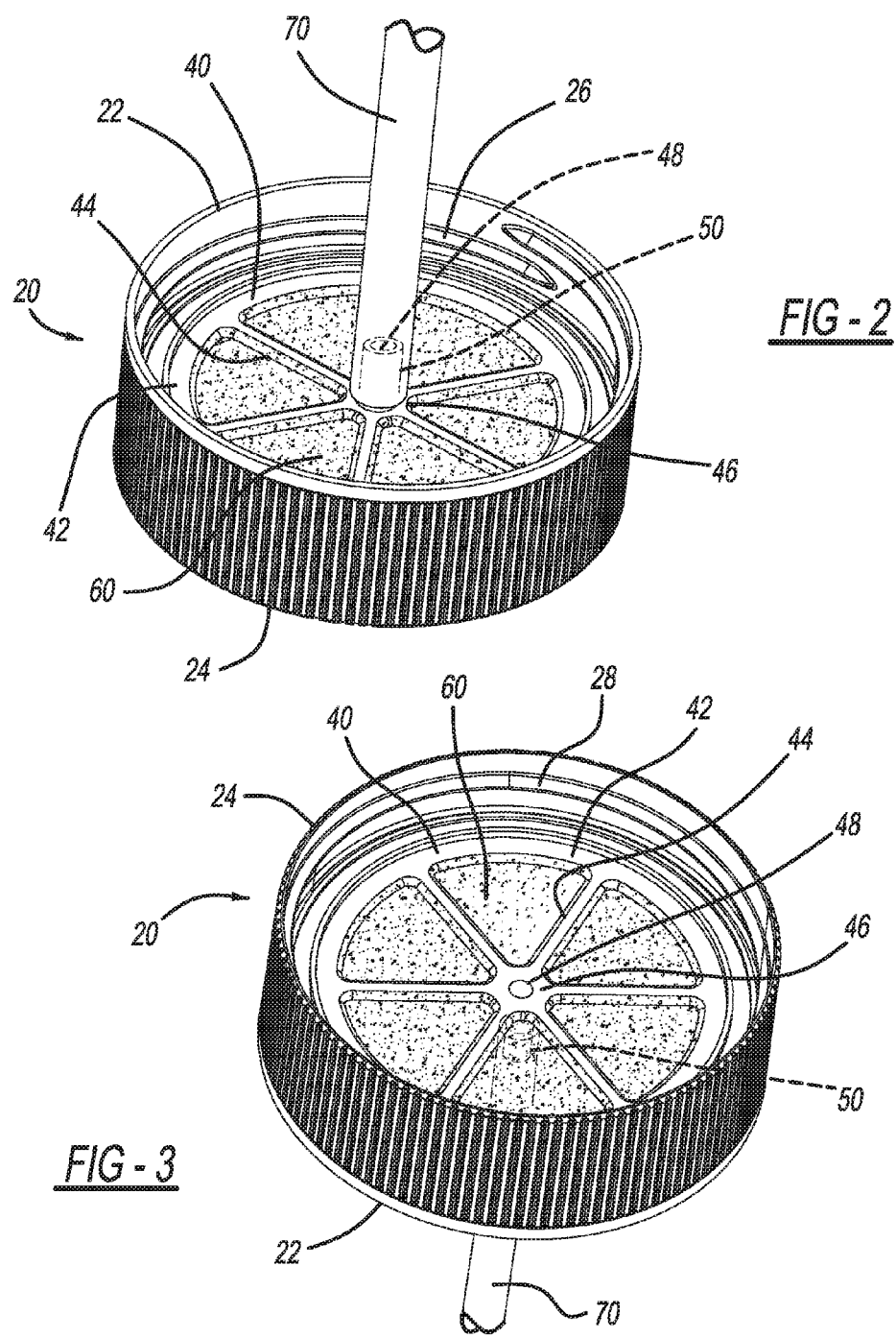

COLD BREW FILTER SYSTEM

CROSS-REFERENCE TO RELATED APPLICATIONS

This application claims the benefit of U.S. Provisional Application No. 62/186,774, filed on Jun. 30, 2015. The entire disclosure of the above application is incorporated herein by reference.

FIELD

The present disclosure relates to a cold brew filter system for making cold brew coffee.

BACKGROUND

This section provides background information related to the present disclosure, which is not necessarily prior art. Cold brew coffee is made by steeping coffee grounds in water for a suitable period of time, such as about 12 hours or more, which yields a cold brew coffee concentrate. The coffee concentrate must be filtered from the coffee grounds prior to drinking. A number of filtration devices and methods exist, but they are messy and inefficient, and often result in spillage. It would therefore be desirable to have an improved cold brew coffee filtration assembly that prevents spillage and is easy to use. The present teachings address these needs and deficiencies in the art.

DRAWINGS

The drawings described herein are for illustrative purposes only of select embodiments and not all possible implementations, and are not intended to limit the scope of the present disclosure.

FIG. 2 is a perspective view of a first side of a closure of the cold brew coffee filtration assembly of FIG. 1;

FIG. 3 is a perspective view of a second side of the closure; and

Corresponding reference numerals indicate corresponding parts throughout the several views of the drawings.

DETAILED DESCRIPTION

Example embodiments will now be described more fully with reference to the accompanying drawings.

Figure 1:
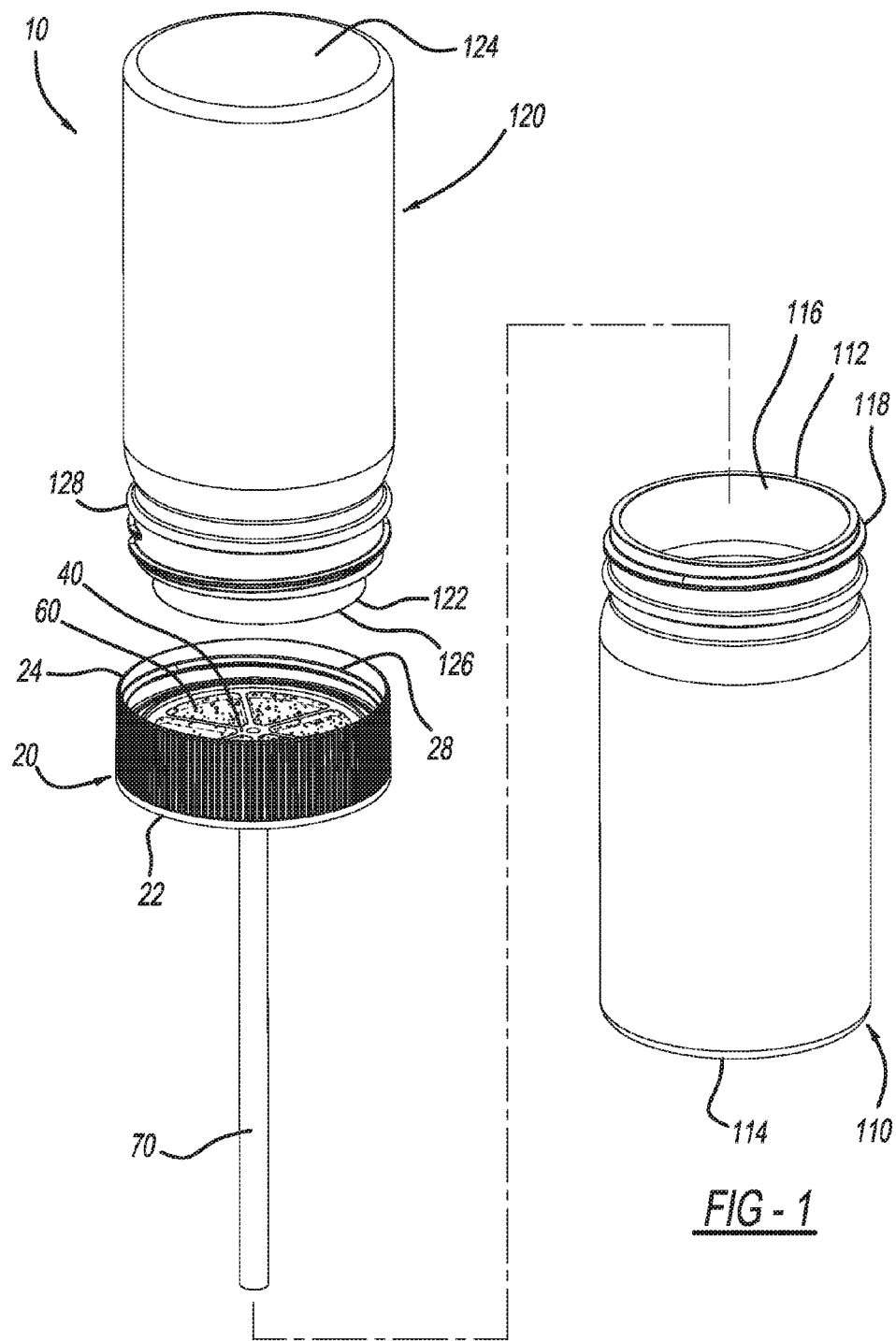
FIG. 1 is an exploded view of a cold brew coffee filtration assembly according to the present teachings.

With initial reference to FIG. 1, a cold brew coffee filtration assembly according to the present teachings is illustrated at reference numeral 10. The filtration assembly 10 generally includes a closure 20 configured to be connected to both a first container 110 and a second container 120 in order to filter coffee concentrate formed from steeping coffee grounds in water. The first and second containers 110 and 120 can be made of any suitable material such as glass, metal, or thermoplastic. For example and as further described herein, after steeping coffee grounds in water within the first container 110 for an extended period of time, such as about 12 hours or more, the assembly 10 is rotated 180° to filter the coffee concentrate through a filter 60 of the closure 20. Because the filter 60 is sized to permit passage of coffee concentrate and restrict passage of coffee grounds therethrough, the coffee concentrate passes to the second container 120, but the coffee grounds do not.

With continued reference to FIG. 1 and additional reference to FIGS. 2 and 3, the closure 20 will now be described in detail. The closure 20 generally includes a first side 22 and a second side 24, which is opposite to the first side 22. At the first side 22 is a first coupling member 26 and at the second side 24 is a second coupling member 28. The first and second coupling members 26 and 28 can be any suitable coupling members configured to secure the first container 110 to the first side 22 of the closure 20, and secure the second container 120 to the second side 24 of the closure 20. Specifically, the first coupling members 26 can be configured to couple with first container coupling members 118 of the first container 110, and the second coupling members 28 can be configured to couple with second container coupling members 128 of the second container 120. The coupling members 26, 28, 118, and 128 can be any suitable coupling members, such as coupling threads as illustrated.

The closure 20 further includes a support 40. The support 40 includes a support ring 42 and a plurality of support spokes 44 extending therefrom to a support hub 46. The support hub 46 is generally at an axial center of the support ring 42. The support hub 46 defines a center aperture 48 extending therethrough. The center aperture 48 is generally an air channel that extends through the support 40. Extending from the support hub 46 at the first side 22 of the closure 20 is a support boss 50. The support boss 50 is aligned with the center aperture 48, and further defines the air channel. The support 40 is configured to support the filter 60. Any suitable supporting device, assembly, and/or apparatus can be used to support the filter 60, and thus the present teachings are not limited to the specific support 40 described and illustrated.

The filter 60 can be any suitable filter configured to restrict the passage of cold brew coffee grounds therethrough, and configured to permit passage of cold brew coffee concentrate resulting from steeping coffee grounds in water. The filter 60 can include openings of any suitable size to provide such filtration, such as openings of about 10µ to about 100µ. The filter 60 can be made of any suitable material. For example, the filter 60 can be made of any suitable metal, polyester, nylon, paper, screen, mesh, membrane, etc.

Figure 4:
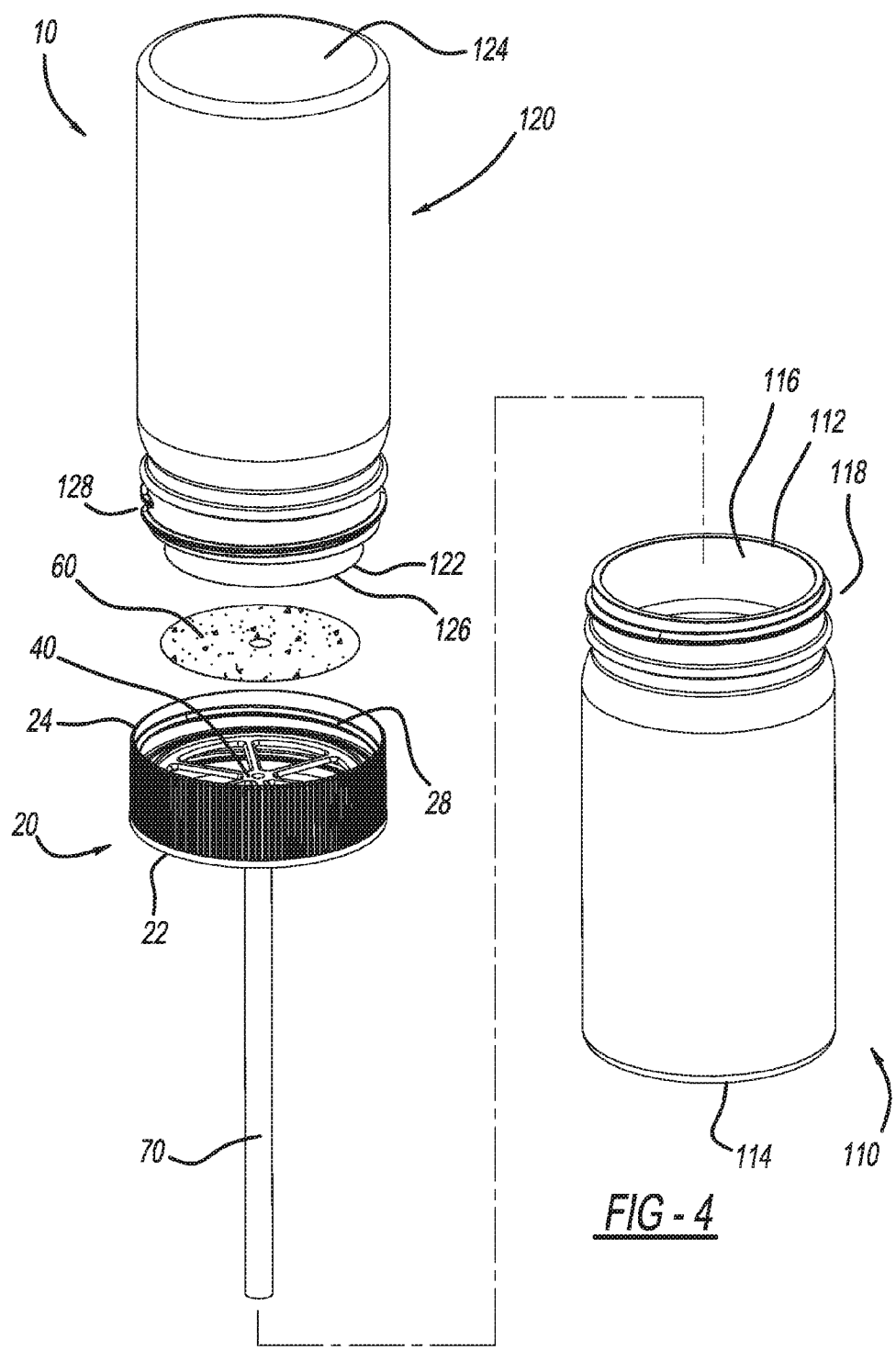
FIG. 4 is another exploded view of the cold brew coffee filtration assembly according to the present teachings illustrating a filter thereof formed as a separate piece and configured to be secured to the closure in any suitable manner, such as with an adhesive.

The filter 60 can be supported by the closure 20 in any suitable manner. For example and as further described herein, if the closure 20 is injection molded, the filter 60 can be insert molded to the support 40. With reference to FIG. 4, if the closure 20 is printed with a three-dimensional printer, for example, the filter 60 may be provided as a separate piece that is secured to the closure in any suitable manner. For example, the filter 60 can be secured to the support 40 with an adhesive.

An air tube 70 is connected to the support boss 50 in any suitable manner, such as with a press fit, and is made of any suitable material. Alternatively, the air tube 70 can be integral with the support hub 46. The air tube 70 can be aligned with the center aperture 48 of the support 40, and thus further defines the air channel so as to provide a continuation of the air channel. The air tube 70 can have any suitable length, such as a length that extends the air tube 70 to, or proximate to, bottom 114 of the first container 110 when the closure 20 is secured to the first container 110, as further described herein. Although the air tube 70 is illustrated as extending from a center of the filter 60, the air tube 70 can be offset from the center of the filter 60. For example, the air tube 70 can extend from an outer periphery of the filter 60, a side of the filter 60, or at any other suitable location. The air tube 70 can include a one-way valve or membrane to prevent fluid from entering the tube, but still allowing air to pass through to be vented.

The closure 20 can be manufactured in any suitable manner, and can be made of any suitable material, such as metal or thermoplastic. For example, the closure 20 can be manufactured by injection molding or three-dimensional printing. With respect to injection molding, any suitable injection mold can be used, such as an injection mold having a hydraulic two-step ejection on a cavity side and a two-step machine ejection on a core side. This allows for threads to be stripped off of the mold on both the core and cavity side thereof, which advantageously reduces mold cost and increases productivity.

To manufacture the closure 20, the mold is installed into an injection molding machine. When the mold is open, the filter 60, or any other suitable filter, can be inserted into the mold, where the filter 60 is located by a center core pin. Once the mold closes, the filter 60 is held in place by "shut off" areas of the mold (openings of the filter 60). Plastic is then injected into the mold and through an injection gate. Molten plastic flows through the filter 60 thus filling out both sides of the geometry of the closure 20. Once the plastic has cooled sufficiently to eject, the mold will open, first pulling the closure 20 out of the cavity while the inner cavity threads remain on the core pin. Once the outer cavity is clear of the mold, the cavity hydraulic ejection will force the closure 20 off of the cavity threads. The closure 20 will be completely free of the cavity half of the mold at this time. When the mold is fully opened, the machine ejection sequence will start and will first push the closure 20, on the core pin, out of the core plate. Once cleared, the center core pin will stop, but the sleeve will continue moving forward, which will push (strip) the threaded portion of the closure 20 from the mold core. At this point, the closure 20 will be free of the mold and can either fall to a part removal conveyor or be removed by a robot.

An exemplary method of using the cold brew coffee filtration assembly 10 will now be described. Coffee grounds, ground in any suitable manner, are loaded into the first container 110 along with water. The grounds and water are loaded through opening 116 defined at top 112 of the first container 110. The top 112 is opposite to the bottom 114. The coffee grounds are steeped in water for any suitable period of time, such as about 12 hours or more, to yield a liquid cold brew coffee concentrate.

With the first container 110 seated on a preferably flat surface, the closure 20 is secured to the first container 110 through cooperation between the threads of the first coupling member 26 and the threads of the first container coupling member 118. The air tube 70 extends through the opening 116 of the first container 110 towards, and nearly to the, bottom 114 of the first container 110.

The second container 120 is coupled to the closure 20 at the second side 24 thereof. The second container 120 includes a top 122, a bottom 124 opposite to the top 122, an opening 126 defined at the top 122, and the second container coupling member 128 proximate to the top 122. The second container 120 is coupled to the second side 24 of the closure 20 through cooperation between the threads of the second coupling member 28 and the second container coupling member 128. Coupling the first and second containers 110 and 120 to the closure 20 results in a generally airtight seal between the first and second containers 110 and 120, thus preventing coffee concentrate and/or coffee grounds from leaking out from within the assembly 10.

To separate the coffee concentrate from the coffee grounds, the cold brew coffee filtration assembly 10 is rotated 180°, and the second container 120 is placed on a preferably flat surface. As a result, under the influence of gravity the coffee concentrate will flow out from within the first container 110, through the filter 60, and into the second container 120. Because the filter 60 is configured to restrict passage of coffee grounds, the grounds do not flow into the second container 120. To prevent a vacuum from forming within the assembly 10, which would hamper or prevent flow of the coffee concentrate from the first container 110 to the second container 120, when the assembly 10 is rotated 180° air within the first container 110 flows into the second container 120 through the air tube 70, the support boss 50, and the center aperture 48.

After the coffee concentrate has been filtered and has passed to the second container 120, the closure 20 can be decoupled from the second container 120. The coffee concentrate can then be consumed as desired, or stored for later consumption. The closure 20 can also be decoupled from the first container 110 to permit the coffee grounds to be disposed of. The closure 20, the first container 110, and the second container 120 can be cleaned and reused.

The present teachings thus advantageously provide for a cold brew coffee filtration assembly 10 that allows cold brew coffee concentrate to be easily and cleanly filtered from coffee grounds without spillage and without a vacuum being formed therein, which may hamper filtration. The present teachings provide for numerous other advantages as well, as will be recognized by one skilled in the art.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cold brew coffee filtration assembly comprising:
   a closure including:
      a first side having a first coupling member configured to couple the closure to a first container;
      a second side having a second coupling member configured to couple the closure to a second container;
      a filter between the first and the second coupling members;
      a support member supporting the filter and defining an air channel extending through the support member and across the filter; and
      a tube configured to be connected to the support member and extend from the first side of the closure proximate to a bottom of the first container when the first container is coupled to the first side of the closure, the tube further defining the air channel;
   wherein the first coupling member includes first coupling threads configured to cooperate with first container threads of the first container.

2. The cold brew coffee filtration assembly of claim 1, wherein the second coupling member includes second coupling threads configured to cooperate with second container threads of the second container.

3. The cold brew coffee filtration assembly of claim 1, further comprising the first container and the second container.

4. The cold brew coffee filtration assembly of claim 1, wherein the filter includes at least one of metal, polyester, and nylon.

5. The cold brew coffee filtration assembly of claim 1, wherein the filter is molded to the support member of the closure.

6. The cold brew coffee filtration assembly of claim 1, wherein the filter is secured to the support member with an adhesive.

7. The cold brew coffee filtration assembly of claim 1, wherein the support member includes a support boss, the support boss further defining the air channel; and
   wherein the tube is configured to be connected to the support boss.

8. The cold brew coffee filtration assembly of claim 1, wherein the support member includes a support ring, a support hub at an axial center of the support ring, and support spokes extending between the support ring and the support hub;
   wherein the support hub defines the air channel.

9. A cold brew coffee filtration assembly comprising:
   a closure including:
      a first side having a first coupling member configured to couple the closure to a first container;
      a second side having a second coupling member configured to couple the closure to a second container;
      a filter between the first and the second coupling members;
      a support member supporting the filter and defining an air channel extending through the support member and across the filter; and
      a tube configured to be connected to the support member and extend from the first side of the closure proximate to a bottom of the first container when the first container is coupled to the first side of the closure, the tube further defining the air channel;
   wherein the support member includes a support boss, the support boss further defining the air channel; and
   wherein the tube is configured to be connected to the support boss.

10. A cold brew coffee filtration assembly comprising:
    a closure including:
       a first side having a first coupling member configured to couple the closure to a first container;
       a second side having a second coupling member configured to couple the closure to a second container;
       a filter between the first and the second coupling members;
       a support member supporting the filter and defining an air channel extending through the support member and across the filter; and
       a tube configured to be connected to the support member and extend from the first side of the closure proximate to a bottom of the first container when the first container is coupled to the first side of the closure, the tube further defining the air channel;
    wherein the support member includes a support ring, a support hub at an axial center of the support ring, and support spokes extending between the support ring and the support hub;
    wherein the support hub defines the air channel.

* * * * *